July 20, 1937.  L. L. HOUCHIN  2,087,687

APPARATUS FOR PRODUCING ONE-PIECE MULTIFOCAL OPHTHALMIC LENSES

Filed July 27, 1934   5 Sheets-Sheet 1

INVENTOR.
Lowell L. Houchin.
BY Corbett + Mahony
ATTORNEYS.

July 20, 1937.  L. L. HOUCHIN  2,087,687
APPARATUS FOR PRODUCING ONE-PIECE MULTIFOCAL OPHTHALMIC LENSES
Filed July 27, 1934  5 Sheets-Sheet 2

INVENTOR.
Lowell L. Houchin.
BY Corbett + Mahoney
ATTORNEYS.

July 20, 1937.  L. L. HOUCHIN  2,087,687
APPARATUS FOR PRODUCING ONE-PIECE MULTIFOCAL OPHTHALMIC LENSES
Filed July 27, 1934  5 Sheets-Sheet 3

INVENTOR.
Lowell L. Houchin.
BY Corbett + Mahoney
ATTORNEYS.

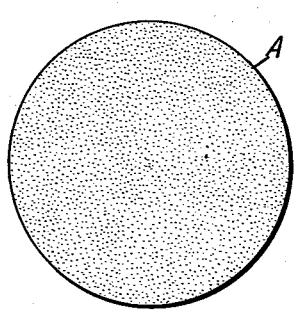  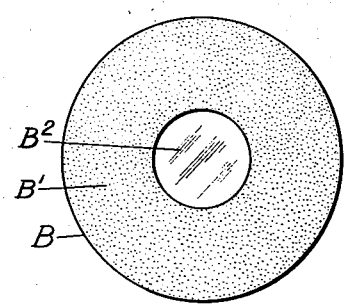 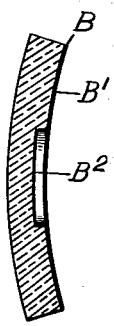
Fig. 10   Fig. 11   Fig. 12   Fig. 13
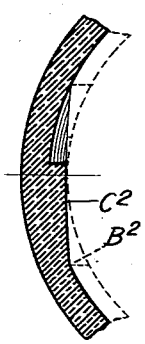 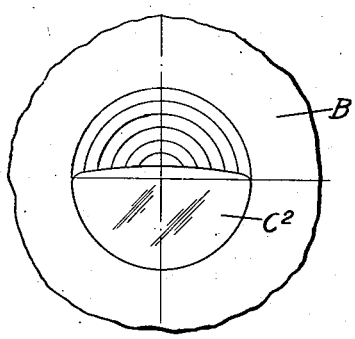 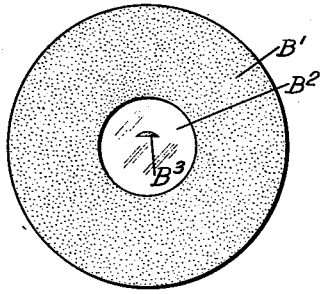
Fig. 14   Fig. 15   Fig. 16
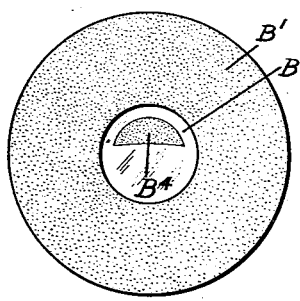 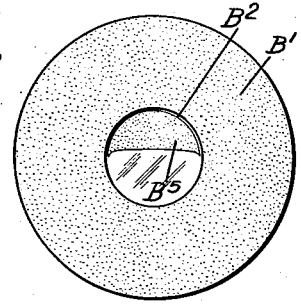 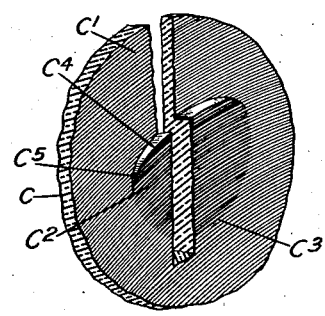
Fig. 17   Fig. 18   Fig. 19
INVENTOR.
Lowell L. Houchin.
BY Corbett + Mahoney
ATTORNEYS.

July 20, 1937.  L. L. HOUCHIN  2,087,687
APPARATUS FOR PRODUCING ONE-PIECE MULTIFOCAL OPHTHALMIC LENSES
Filed July 27, 1934  5 Sheets-Sheet 5

INVENTOR.
Lowell L. Houchin
BY Corbett & Mahoney
ATTORNEYS.

Patented July 20, 1937

2,087,687

UNITED STATES PATENT OFFICE 2,087,687

APPARATUS FOR PRODUCING ONE-PIECE MULTIFOCAL OPHTHALMIC LENSES

Lowell L. Houchin, Columbus, Ohio, assignor to Daniel D. Hubbell, Columbus, Ohio Application July 27, 1934, Serial No. 737,268

6 Claims. (Cl. 51—127)

My invention relates to apparatus for producing one-piece multifocal ophthalmic lenses. It relates, more particularly, to a novel apparatus for producing one-piece bifocal lenses, though it is also applicable to the production of one-piece lenses having more than two fields of vision.

In the prior art, several different types of one-piece bifocal lenses have been marketed. However, most of these types have embodied a reading segment with its upper edge in the form of a deep arc. One type that has been marketed involves a stright line upper edge and a straight line lower edge but this type possesses marked shoulders practically all around the segment portion. It has been suggested that a bifocal lens be made with a reading segment having a substantially flat upper edge and with the balance of the edge of this segment approximately in the form of a semi-circular arc with the surface of the segment merging with the distance portion along the line of this arc. However, such methods as have been devised for the production of this suggested type of bifocal have either been inoperative or have been undesirably complicated.

For example, one method proposed for making a lens of this suggested type calls for the initial production of a lens blank with a circular reading segment within a surrounding distance portion and the subsequent grinding away of the upper half of the circular segment so that there is formed a semi-circular segment with a flat top line. This method cannot be made operative, however, because the surface formed by thus cutting away the segment cannot be brought into exact continuity with an already polished surface for two reasons. First, it is practically impossible to so adjust two different operations as to grind the same identical curvature. Second, any device which contemplates finishing one surface into continuity with another, wherein the abrading tool overlaps the other surface will leave an imprint of the abrading tool on the finished surface or will form a distorted area near the junction of the two surfaces. Furthermore, one form of apparatus proposed for thus grinding away the upper half of the circular segment is in the form of a grinding wheel which reciprocates across the upper half of this circular segment and would further accentuate the impracticability of bringing the ground away area into continuity to the distance vision portion of which it is intended to become a part.

One of the objects of my invention is to provide apparatus which is of such a nature that it may be used for producing multifocal lenses having segments of any desired shape and size.

Another object of my invention is to provide apparatus for producing one-piece multifocal ophthalmic lenses which is of such a nature that the lenses produced will be of superior quality.

Another object of my invention is to provide apparatus for producing one-piece multifocal lenses which is simple in structure, easy to operate and particularly positive and efficient in operation.

Another object of my invention is to provide apparatus for producing one-piece multifocal ophthalmic lenses which is of such a nature that a lens produced thereby may be provided with any amount of prism in the segment and with the base of the prism located at any desired position and, consequently, with the optical center thereof located as desired. This, in itself, provides a means for locating the optical center of the reading field at any predetermined point in the finished lens.

Another object of my invention is to provide an apparatus of such a nature that it will produce lenses having segments of accurate and any predetermined shape and which is of such a nature that it will produce segments of identical shape in a multiplicity of lens blanks.

Another object of my invention is to provide apparatus for producing lenses of the type indicated which is provided with means for holding the lens blank which is of such a nature that it may be removed, for purpose of inspecting the lens blank, from time to time, during the formation of the lens blank and which may be readily replaced without danger of error.

Another object of my invention is to provide apparatus for producing lenses of the type indicated which will subject the lens blank to an abrading operation to form an outer surface on the bifocal side thereof and to simultaneously form the outer boundary of a segment of non-circular shape, the apparatus being provided with means to insure that in forming the lens, the abrading operation will not be carried on to an undesirable extent.

Another object of my invention is to provide apparatus for producing one-piece multifocal ophthalmic lenses, the apparatus being readily adjustable to insure that the surfaces produced thereon will be of accurate, predetermined curvature and will be disposed in proper relation to each other.

My invention is a radical departure from prior suggested methods of producing bifocal lenses with reading segments of non-circular form, in that the blank is initially formed with a finished reading segment area of circular form in depressed relation to a surrounding partially finished area which usually serves as the distance portion. Then, the surrounding area is finished and, in the finishing thereof, a portion of the segment is eliminated. In other words, the reading segment area is first ground to finished curvature in depressed relation to the surrounding area. Then the grinding of the surrounding surface to finished curvature is automatically controlled and directed so that an area of the initial reading segment is eliminated and converted into a part of the surrounding surface in one and the same operation with the finishing of the surrounding surface.

The machine which I use comprises, mainly, an abrading tool adapted to contact with the surface of the lens blank mounted on a lens blank carrier, which is rotatably mounted on the machine. This abrading tool rotates about its own axis and is located at one side of the center of the lens blank carrier. The lens blank carrier is also mounted for oscillating movement relative to the abrading tool and means is provided for effectively and positively controlling this movement. This means preferably comprises a cam of proper outline which is attached directly to the lens blank carrier. When the carrier rotates, the cam contacts with a suitable stationary member and controls movement of the lens blank carrier relative to the abrading tool. By moving the lens blank carrier in this manner, relative to the abrading tool, the abrading tool is caused to trace a closed non-circular path on the lens blank, producing a non-circular outline on the inner area of the lens blank. The outline produced will depend upon the shape of the cam which is used and it is possible to use practically any desirable shape. Because of the fact that the cam is mounted directly on the lens blank carrier, it is possible to remove the carrier and lens blank, from time to time, for purpose of inspecting the lens blank, and to replace the carrier and lens blank without altering the relative positions of the lens blank and the cam, thereby eliminating any chance of error due to misalignment. The apparatus and, specifically, the lens blank carrier, may be adjusted in such a manner that the outer surface produced by the machine on the lens blank will be tilted in any direction relative to the surface of the inner area. Thus, prism may be produced in the segment, with the base thereof located as desired. The apparatus is further provided with means which will eliminate the danger of carrying on the last abrading operation or operations to an undesirable extent.

The novel apparatus which I preferably employ is illustrated in the accompanying drawings, wherein similar characters of reference designate corresponding parts and, wherein:

Figure 10 is a plan view of a rough blank of glass.

Figure 11 is a section of the blank shown in Figure 10 and showing that the blank is of concavo-convex form.

Figure 12 is a plan view of the blank shown in Figures 10 and 11, after it has been subjected to the preliminary steps of my preferred method, namely, the proper abrading operation to produce thereon an outer surface of annular form and an inner area of circular outline.

Figure 13 is a section of the lens blank of Figure 12 and showing how the inner area is disposed below the outer surface.

Figure 14 is an enlarged section of a lens blank, illustrating diagrammatically how the circular inner area of the lens blank is subsequently changed into an area of non-circular outline.

Figure 15 is a plan view of the lens blank of Figure 14 and illustrating diagrammatically how a portion of the circular inner area is subsequently ground away to form an inner area of non-circular outline.

Figure 16 is a plan view of the blank during the first stages of the abrading operation which changes the shape of the circular inner area, showing how a slight portion of the inner area has been ground away.

Figure 17 is a plan view of the lens blank after the abrading operation has progressed and showing that a greater portion of the inner area has been ground away.

Figure 18 is a plan view similar to Figure 17 of the lens blank after the abrading operation has progressed to such an extent that the desired portion of the inner area has been almost entirely removed.

Figure 19 is an enlarged perspective view, partly cut away, of a finished lens blank made in accordance with my invention and showing a non-circular inner segment which has a shoulder along its upper flat edge and which has its arcuate edge merging with the surrounding area.

Figures 1, 2:
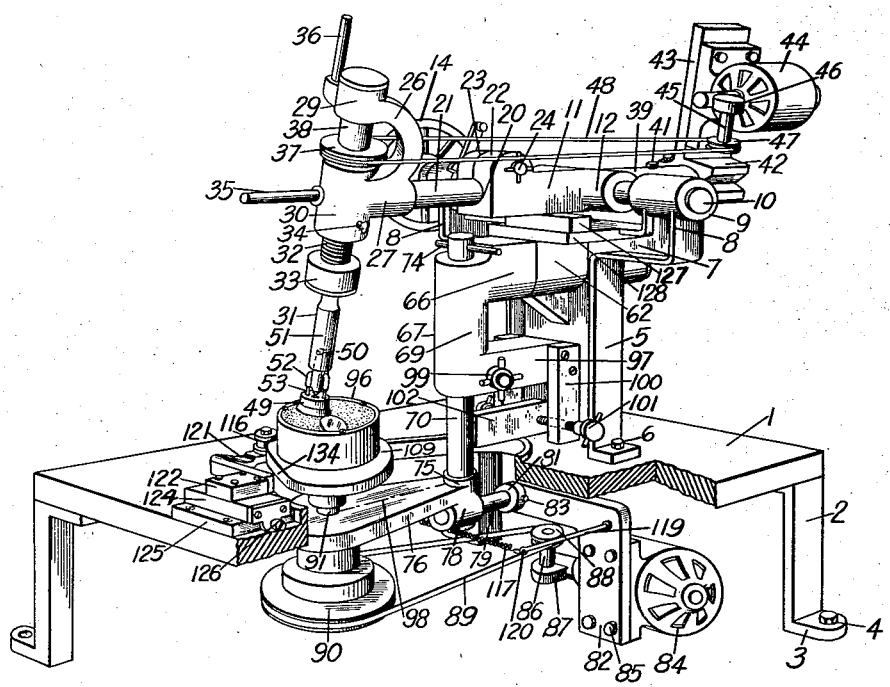
Figure 1 is a perspective view, partly broken away, of a machine which I have devised for producing an outer surface on a lens blank and simultaneously forming the outer boundary of an inner segment of said blank.
Figure 2 is an enlarged detail in side elevation, illustrating the lens blank carrier and the abrading tool positioned thereon and also showing the cam-controlling means which controls movement of the lens blank carrier relative to the abrading tool.

With reference to the drawings and, particularly, to Figures 1 to 8, inclusive, I have illustrated the preferred form of apparatus which I use in performing the abrading operation or operations of my method which results in the changing of the circular inner area to an area of any desired non-circular outline and which simultaneously finishes the outer area to the desired curvature.

From these figures, it will be apparent that my machine embodies a metal base plate 1 of rectangular shape. This base plate 1 has a leg member 2 located at each corner thereof. The leg members have lugs 3 disposed at right angles to the body portion thereof and at the lower end thereof and these lugs 3 have bolt holes 4 by means of which the machine may be secured to a suitable supporting structure.

Above this base plate 1, I mount an abrading tool and driving mechanism therefor. Thus, a vertical standard 5 is provided which has its lower end bolted to the upper surface of the base plate 1, as indicated at 6, and adjacent the rear end of the base plate. The supporting standard 5 has a yoke 7 formed at its upper end. Each arm 8 of the yoke 7 has a bearing 9 formed at its upper end. The bearings 9 are adapted to receive the outer ends of a hinge pin 10. The hinge pin is mounted in the bearing members 9 in such a manner that it may both turn and slide longitudinally therein.

Figure 5:
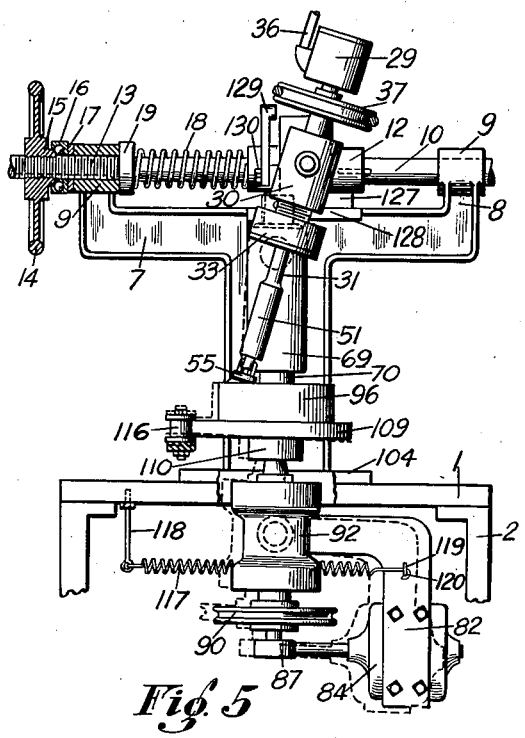
Figure 5 is an end view of the machine shown in Figure 1, taken at the end where the abrading tool and lens blank carrier are disposed, and illustrating by dotted lines the movement of the lens blank carrier and associated parts.
Figure 6:
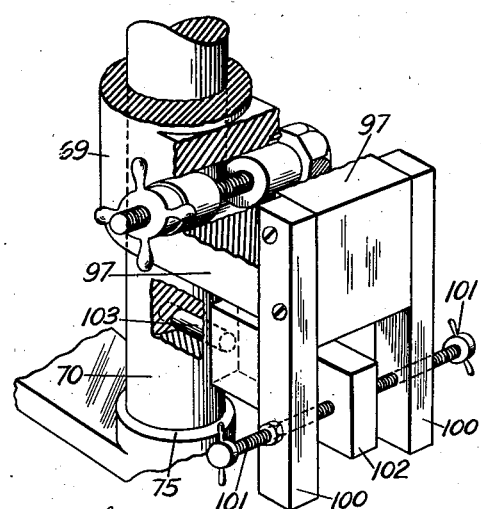
Figure 6 is a detail in perspective of an adjusting mechanism used on my machine.

Mounted on the hinge pin 10 is a block 11. This block 11 has a tubular housing 12 at the rear end thereof through which the pin 10 extends. The tubular housing 12 is shorter than the space between the upstanding arms 8 of the yoke member 7, as indicated in Figure 5. Thus, a substantial space will be left between the outer ends of the tubular housing 12 and the inner ends of the bearing members 9. The block 11 is attached to the pin 10 in such a manner that it may be raised or lowered. Also, when the pin 10 is moved longitudinally of its bearing members, the block 11 will move therewith.

The means for moving the pin 10 longitudinally in its bearing members 9 will now be described in detail. As shown best in Figure 5, one end of the pin 10 is threaded as at 13 for a substantial distance. This threaded portion of the pin projects through the bearing member 9. This threaded portion has a hand-wheel 14 threaded thereon. Between the hub 15 of the hand-wheel and the outer end of bearing 9, a thrust bearing 16, preferably of the ball-bearing type, is disposed. Further, between the inner side of thrust bearing 16 and the outer end of bearing 9, the collar 17 is disposed. This collar 17 has a feather which projects into a groove formed in the surface of the pin 10. Thus, the collar 17 is splined on the pin and will rotate therewith but will permit longitudinal movement of the pin therethrough. A compression spring 18 is disposed in surrounding relation to the pin 10 and between the inner end of bearing 9 and one end of the tubular housing 12 on the block 11. Between the outer end of spring 18 and the inner end of bearing 9, a thrust bearing 19 is disposed. This bearing is similar to bearing 16 and will prevent an undesirable amount of friction between the end of the spring and the end of bearing member 9 when the pin 10 is turned.

It will be apparent from the above, that by turning handwheel 14 in the proper direction, the pin 10 and, consequently, the block 11 will be moved longitudinally of bearing members 9, the spring acting to take up all end play that might exist in the adjusting connections. The threaded portion of the pin is of such a length and the tubular portion 12 is of such a length that the right-hand end of the tubular portion 12 will contact with the inner end of the right-hand bearing member 9 before the threaded end of the pin will move completely out of the hub of the hand-wheel. Thus, there will be no danger of the hand-wheel falling off of the end of the shaft.

The block 11, Figure 1, extends forwardly from the pin 10 a considerable distance. It has a socket 20 formed therein for receiving the inner end of a pivot pin 21. The upper edge of this block adjacent its forward end is provided with upstanding lug 22. This lug 22 is split as indicated at 23 and this split extends down to the socket 20. A screw member 24 is properly threaded into the split lug 22 and is adapted, by proper adjustment, to cause the split portion of the block to grip the inner end of pin 21 or to release the pin. Thus, it is possible to adjust the pin 21 in its socket 20 and to hold it in the adjusted position.

The outer end of pin 21 (Figure 3) extends into a socket 25 formed adjacent the lower end of a yoke structure 26. The socket 25 is formed in a tubular extension 27 on the yoke structure. To prevent rotation of the portion 27 on the outer end of pin 21, a pin 28 is provided.

The yoke structure 26 has a vertically disposed bearing member 29 formed on its upper end and a vertically disposed bearing 30 at its lower end. These bearing members 29 and 30 are adapted to receive the upper portion of a tool-carrying spindle 31 which is rotatably mounted therein. The bearing member 30 has threaded into its lower end a sleeve 32. This sleeve 32 is preferably enlarged at its lower end and has a ball-bearing 33 formed therein. The inner part of the ball-bearing is firmly attached to the spindle 31 and the outer part of the ball-bearing is firmly attached to the sleeve 32. By threading the sleeve 32 in and out of the bearing member 30, the spindle 31 will be moved vertically in its bearing members 29 and 30. With this structure, very fine vertical adjustments of the spindle may be secured. This sleeve 32 will be held in any position to which it is adjusted by a set screw 34 which is threaded through the wall of bearing member 30. The bearing member 30 has a socket formed on its outer surface in which a pin 35 may be threaded. This pin serves as a handle member. A second pin 36 (Figure 4) may be disposed on the outer portion of bearing structure 29 and preferably extends vertically for the purpose of mounting weights (not shown) thereon if desirable.

Figure 3:
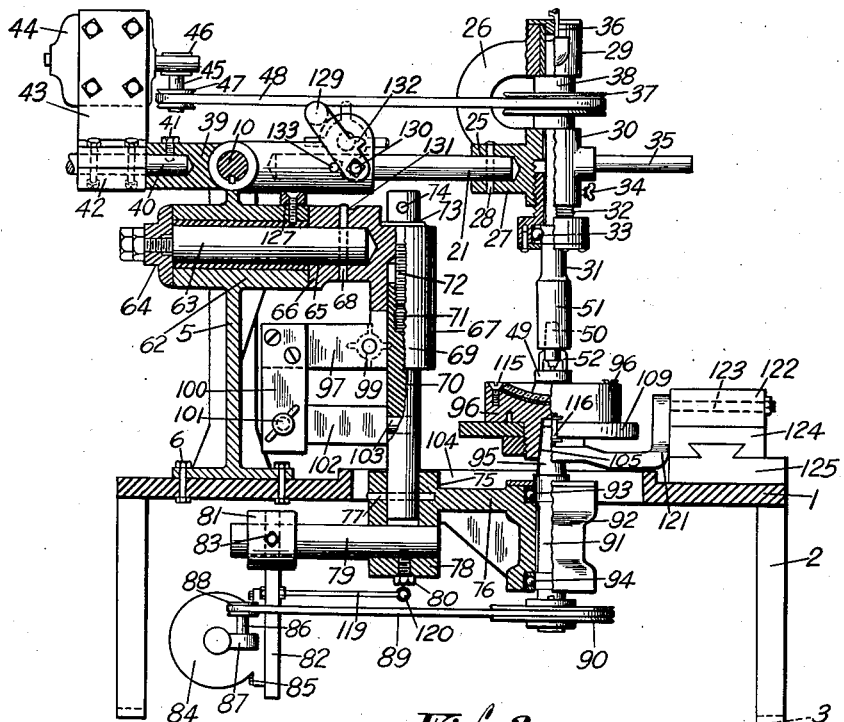
Figure 3 is a vertical longitudinal section, taken through the machine illustrated in Figure 1.
Figure 4:
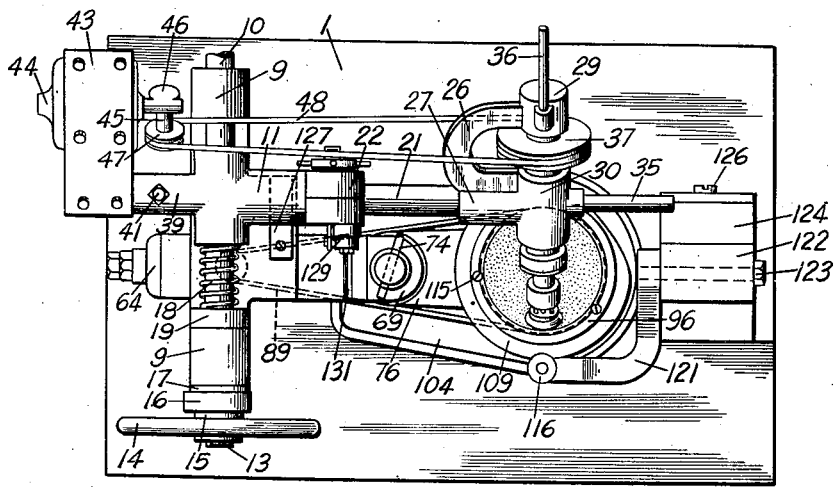
Figure 4 is a plan view of the machine shown in Figure 1.

The means for driving the tool-carrying spindle 31 will now be described in detail. As shown in Figures 1, 3 and 4, the spindle adjacent its upper end is provided with a pulley 37 which is splined thereon in such a manner that it will rotate with the spindle but the spindle can move vertically therethrough. This pulley is provided with hubs 38 which hold it in a fixed position between bearing members 29 and 30, (Figure 3).

The block 11 has an extension 39 at its rear side. A rod 40 has its inner end disposed in a socket formed in this extension. A set screw 41 is provided for holding the rod in its socket. On the outer portion of rod 40, a clamp member 42 is disposed. This clamp member 42 will normally clamp the rod 40 but may be loosened and moved to any position longitudinally of the rod or be turned on the rod and again clamped in position.

This clamp structure has an upstanding supporting member 43 formed as a part thereof. To this supporting member is suitably secured an electric motor 44 or the like. This motor 44 drives a vertical shaft 45 through the medium of speed-reducing worm and gear mechanism 46. The lower end of the shaft 45 has a pulley 47 keyed thereon. The pulley 47 drives the pulley 37 through the medium of a belt 48.

It will be apparent that the spindle 31 which carries the tool may be adjusted to any angle relative to the vertical, by turning the pivot pin 21 in its socket 20. The clamp member 42 may also be correspondingly turned on the rod 40 so that the pulleys 37 and 47, which are in line with each other, will always be in the same plane and the belt 48 will not be twisted. The clamp member 42 may also be adjusted along the rod 40, as desired, to keep the belt which passes around the pulleys 37 and 47 as tight as necessary.

The motor 44 will always rotate the tool spindle 31 about its own axis, through the medium of the worm gear mechanism 46 and the belt and pulley mechanism. This is true, even when the tool-carrying spindle and the associated mechanism is swung upwardly into inoperative position. By means of the handle 35, the tool-carrying spindle and associated parts may be swung upwardly out of operative position. When this is done, the hinge pin 10 will turn in its bearings and the block 11 will swing upwardly. However, since the spindle and the driving motor are mounted on extensions of the block 11, the driving mechanism for the spindle is operative at any position of adjustment.

Figure 7:
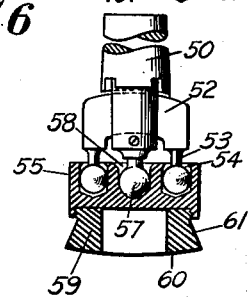
Figure 7 is a view, partly in section and partly in side elevation, of an abrading tool which may be used on my machine.

The lower end of the spindle 31 has an abrading tool 49 disposed thereon. This tool is preferably of the "free" type. That is, it is mounted on the lower end of the spindle in such a manner that it may rock universally thereon. In Figure 7, I show a "free" tool of the type which I preferably use. This tool embodies a slightly tapered stem 50, which is adapted to fit within a chuck 51, Figure 5, on the lower end of the spindle 31. This tapered portion has a block 52 disposed between the legs of its bifurcated lower end. The block 52 is preferably held immovably in position on the lower end of member 50. This block 52 is provided with depending pins 53 having sphere shaped ends.

The pair of pins 53 extend into a pair of sockets 54 formed in the upper side of a metal disc 55 which forms a part of the tool proper. They fit loosely therein and serve to drive the tool with the spindle 31. The lower end of member 50 also has a ball 57 formed thereon which fits into a socket 58 in the member 55. On the lower surface of member 55 a ring portion 59 of the tool is disposed. Downward pressure, due to the weight of the spindle 31 and its associated parts, is transmitted through the ball 57 into the ring portion 59. This ring portion is preferably made of a metal, as brass or the like, and is held on the tool in a suitable manner. Or, for the polishing operation, this ring portion may be formed of "pitch" or the like. This portion 59 serves as the abrading portion of the tool and contacts with the surface to be operated upon. The lower edge of the ring 59 is curved as at 60 to a curvature slightly flatter than that of the curvature which it is to impart to the lens blank. The curvature which is to be formed on the lens blank is actually determined by the angle of the axis of the spindle 31 with relation to the angle of the axis of rotation of the lens carrier, to be described subsequently. The edge of the ring 59 is beveled downwardly and outwardly as at 61.

Although I preferably use a "free" tool of the type disclosed, since I have found that its use results in the production of a more accurate and higher quality lens blank, it will be understood that I may also use a tool which is rigidly mounted on the lower end of the spindle and is not permitted to rock relative thereto.

The means for carrying the lens blank and rotating it and also for moving the lens blank carrier relative to the stationary abrading tool, will now be described in detail. It will be apparent from Figure 3 that the vertically disposed supporting structure 5 has an elongated substantially horizontally disposed bearing member 62 formed thereon. Within this bearing member a pivot pin 63 is mounted. An end thrust collar 64 is secured on an extension on the end of pin 63 by the locking nuts shown.

The pin 63 projects forwardly from the bearing member 62 a substantial distance. This projecting portion of the pin extends into a socket 65 which is formed in the upper rearwardly extending arm 66 of a depending structure 67. A cross-pin 68 is provided for holding pin 63 within member 66. As will appear later, the balance of this unit which carries the lens blank carrier and associated parts will swing about the axis of the pivot pin 63. The structure 67 has a vertically disposed tubular housing 69 formed thereon. This housing 69 has the upper end of a vertically disposed cylindrical rod 70 projecting thereinto. The extreme upper end of the rod 70 has a threaded socket 71 formed therein. Threaded into the socket 71 is the lower end of a screw 72. This screw 72 has a flange 73 formed on its upper end and this flange abuts the upper end of the housing 69. By means of a handle structure 74, the screw 72 may be rotated in either direction. Rotation of the screw 72 will cause raising or lowering of the rod 70. Thus, the rod 70 may be accurately adjusted vertically.

The rod 70 extends downwardly below the base plate 1. The lower end of this rod 70 is disposed in a tubular housing 75 formed on the rear end of an arm 76. The end of the rod 70 is held in the housing 75 by means of a cross-pin 77.

Below the housing 75 a horizontally disposed tubular housing 78 is formed. This housing 78 is adapted to receive the forward end of a cylindrical rod 79. The rod 79 is held in position in the housing 78 by a set screw 80. The rear end of the rod 79 passes through a tubular member 81 which is formed on the outer end of an inverted L-shaped bracket 82. The bracket 82 is held in position on the rod 79 by a set screw 83. This bracket may be moved to any position longitudinally of the rod 79 and held in adjusted position. Also, it may be swung around rod 79 and held in any position. The depending portion of the bracket 82 has a small electric motor 84 bolted thereto as indicated at 85. This motor 84 drives a vertically disposed rotatable shaft 86 through the medium of worm and gear speed-reducing mechanism 87. The upper end of this shaft 86 has a pulley 88 keyed thereon.

The pulley 88, through the medium of a belt 89, drives a larger pulley 90. This pulley 90 is keyed on the lower end of a rotatable shaft 91. This shaft 91 is adapted to carry the lens blank carrier and is mounted in a vertically disposed bearing housing 92 which is formed as an integral part of the arm 76. This housing 92 is formed at the extreme forward end of arm 76 and depends therefrom. A ball-bearing 93 is disposed at the upper end thereof and a ball-bearing 94 is disposed at the lower end thereof. The shaft 91 is so mounted in housing 92 that vertical movement therein will be prevented. The upper end of the shaft 91 is tapered as indicated at 95 for the reception of a tapered chuck on a lens blank carrier 96 to be subsequently described in detail.

It will be apparent that by raising and lowering rod 70 in its housing 69, the arm 76 and associated parts and the entire driving mechanism for the shaft 91 on which the lens blank carrier is mounted will be raised and lowered. Consequently, this adjustment will not interfere with the driving mechanism for the shaft which carries the lens blank carrier. The member 67 (Figure 1) has a rearwardly extending arm 97 formed on the lower end thereof. A clamping mechanism, shown in detail in Figure 6, having a thumb-wheel control 99, is provided for holding the rod 70 in any position of adjustment.

In order to effect the proper operative alignment between the tool-carrying spindle and the lens blank carrier spindle, I provide the following mechanism: The rear end of arm 97 (Figures 3 and 6) has bolted thereto, on each side thereof, the upper end of a strip of metal 100. These strips of metal are stiff and will not readily bend. As shown more clearly in Figure 6, the lower end of each of these strips of metal has a screw member 101 threaded therethrough. These screw members 101 project inwardly into contact with opposite sides of a strip or block 102 of metal. This block 102 has, at one end thereof, a cylindrical extension 103 which projects into an opening formed diametrically in the lower half of the rod 70. In order to bring the axes of pin 63, rod 70 and spindle 91 into the same plane and to maintain them in such plane, the screw mechanism 99 must first be loosened to permit turning of the rod 70 in its housing. Then, by properly adjusting screws 101, this rod 70 may be turned until the axes of pin 63, rod 70 and spindle 91 are in the same vertical plane. This will insure the attainment and maintenance of the proper operative alignment or, in other words, will insure that the center line 98 of the arm 76 will be parallel with the pin 63 under all conditions of operation. However, it will be apparent that the rod 70 may be vertically adjusted by means of the screw 72 without disturbing the relative alignment of these parts, as part 102 can move vertically between the ends of the screws 101.

It will be apparent from the preceding description that the structure 67, rod 70, arm 76, the motor 84 and the associated mechanism all form a single unit. This entire unit is mounted on the pivot pin 63 which may be turned in the bearing 62 formed adjacent the upper end of the vertical supporting structure 5. Thus, this entire structure may be swung transversely of the base plate 1 around the axis of the pivot pin 63. The base plate 1 is cut away as at 104 sufficiently to permit the desired movement of this unit.

The cam means for controlling this movement and the lens blank carrier which is associated therewith will now be described in detail. The lens blank carrier 96 is provided with a chuck 105 (Figure 8) formed on the lower portion thereof. This chuck 105 has a tapered socket 106 formed therein within which the upper tapered end 95 of the shaft 91 is adapted to fit. The chuck 105 is provided with an enlarged portion 107, which has its outer surface 108 threaded. A cam 109 is provided with an opening so that it will fit around the portion 107 of the lens blank carrier. A collar 110 is adapted to be threaded onto the portion 107 below the cam 109 for holding the cam in position on the lens blank carrier. The upper surface of the cam 109 is provided with an upstanding pin 111 which fits into a socket 112 formed in the lower surface of the body portion of the lens blank carrier 96. Thus, the cam 109 will always occupy a certain position relative to the lens blank carrier 96 and the lens blank mounted thereon. It will be apparent that the cam 109 may be readily removed and replaced with a different cam.

The cam 109 may be of any desired shape, depending upon the shape of inner segment it is desired to produce on the lens blank. One of the important features of my invention resides in the fact that the cam is very large in comparison with the segment which is finally produced on the lens blank. Because of this, it is possible to produce segments on the lens blanks of practically any desired outline and of very accurate outline. In producing a lens with a segment of the particular shape shown in Figure 19, I use a cam of the shape shown in Figure 22 of the drawings.

It is highly desirable to have the cam attached directly to the lens blank carrier since, with such a structure, it will be possible to remove the lens blank carrier, from time to time, during the abrading operation for inspection of the lens blank mounted thereon. When the lens blank carrier is removed, the cam is also removed and its position on the lens blank carrier will not be changed. Thus, the cam will always occupy a certain position relative to the lens blank on the carrier. Therefore, the blank may be inspected merely by removing the lens blank carrier from its spindle and, when the carrier is replaced after inspection, there will be no danger of error, due to misalignment of the cam and lens blank. Obviously, slight misalignment would be fatal to the operation.

The lens blank carrier is provided preferably with a concave upper surface 113 for the reception of a concavo-convex lens blank. The lens blank is held in position by any desired means, as by three screws 115, the heads of which are tapered and cooperate with the edges of the lens blank. When the lens blank is once mounted on the carrier 96 it stays in that position until it is finished. Since the cam is attached directly to the lens blank carrier, the cam and the lens blank will, therefore, always occupy the same position relative to each other.

The cam is always held in contact with a stationary flanged roller 116 (Figure 5). This roller is mounted in such a manner that its axis will be in the plane of oscillation of the axis of the shaft 91 which carries the lens blank carrier. It is disposed at the left side of the cam in Figure 5.

A tension spring 117 is provided for maintaining the cam and roller in contact. This spring has one end fastened to a pin 118 which depends from the base plate 1 and its opposite end is connected to the outer end of a rod 119, (Figure 1), as indicated at 120. The rod 119 extends forwardly from the bracket 82 which carries the motor 84. The spring 117 always tends to swing the entire unit which carries the lens blank carrier towards the left (Figure 5) and, therefore, always maintains the edge of the cam in contact with the roller. The spring 117 is preferably approximately located directly below the rod 70.

The roller 116 is mounted on the outer end of a substantially L-shaped arm 121 (Figure 1). The inner end of this arm is pivoted on a block 122 by means of a pivot pin 123 (Figure 2). This pivotal support permits slight vertical movement of the roller 116 to compensate for the arc in which the cam 109 will swing when the unit which carries it swings around the axis of pin 63, as shown in dotted lines in Figure 5. However, this vertical movement of the roller will be limited. As shown in Figures 1 and 2, the block 122 is bolted on the upper surface of a slide 124 which is mounted on a slideway 125 in the usual manner. Screw mechanism 126 is provided for adjusting slide 124 along member 125. This adjustment may be used to insure that the roller 116 will always contact with the edge of the cam. It may also be used for the purpose of adjusting the lens blank relative to the abrasive tool, as will be described in detail later. The roller 116 is adjustable vertically on the arm 121 by means of a screw and nut on the end of the roller-supporting shaft (see Figure 2). This adjustment is provided to compensate for variations in vertical locations of the cam 109.

In order to prevent the abrading operation from being carried on to an undesirable extent, thereby grinding away too much of the outer surface of the lens blank, I provide the following means: This means comprises a block 127 (Figures 1 and 3), which is mounted on a flat support 128 formed on the upper end of the vertical supporting structure 5. This block serves as a stop for limiting downward swinging of the block 11 around the axis of pin 10. Thus, it also limits the depth to which the abrading tool will reach on the lens blank during the abrading operation or operations. As shown in the drawings, this block 127 lies directly beneath the block 11 and is located in front of the pin 10.

The unit which carries the abrading tool and the operating mechanism therefor may be swung upwardly above the axis of shaft 10, so that the abrading tool will swing away from the lens blank into an inoperative position. When in this position, the lens blank carrier and the lens may be readily removed and replaced. In order to hold the abrading tool up in an inoperative position, I provide the following latch structure:

As shown in Figure 3, this structure embodies a latch member 129 which is pivoted at its lower end to one side of the block 11, as at 130. When the block 11 is swung upwardly, this latch 129 is adapted to be swung downwardly and its lower end will fit in a notch 131, formed in the upper surface of member 66. Thus, the latch will be in a vertical position and will hold up the block 11. The latch is further provided with a lug 132 which cooperates with a pin 133 on block 11 for preventing the latch member from being swung too far, when swung into operative position, and for aiding in maintaining it in vertical position. The pin 133 also prevents rearward swinging of the latch to an undesirable extent when it is in inoperative position.

The manner in which my method is performed in conjunction with the operations of the apparatus just described will now be described in detail.

I first select a suitable rough lens blank A of the type illustrated in Figures 10 and 11. This lens blank A is preferably a concavo-convex form.

I next take this lens blank A and produce the lens blank B, which is illustrated in Figures 12 and 13. I place the lens blank A on a suitable machine and form thereon by grinding or other abrading operation an annular outer surface $B^1$ and an inner area $B^2$ of circular outline. The outer area $B^1$ will surround the inner area $B^2$ of circular outline. The surface of the outer area $B^1$ will be of different curvature than the surface of the inner area $B^2$. The curvature of the inner area $B^2$ will be of greater radius than that of $B^1$. The radius of $B^1$ will be substantially that of the curvature to be finally formed on the outer area of the finished lens blank. The inner area $B^2$ is preferably finished and polished. Also, this inner area is preferably so formed that the surface thereof will be disposed below the surface of the outer area $B^1$, as indicated in Figure 13. The outer area $B^1$ need not be finished, but is preferably left in a semi-finished condition. The lens blank B may be formed by any of the machines now commonly used in the art for producing one-piece bifocal lens blanks having an outer annular area and an inner area of circular outline. I prefer to use in the above machines the carrier shown in Figure 8 with the cam 109 removed. When my machine is subsequently used, the same carrier with its partly completed blank still mounted thereon is used, the cam being first remounted thereon.

As previously stated, I take this lens blank B and subject it to an abrading operation with my machine, the preferred form of which has been described, which finishes the outer area of the lens blank and simultaneously changes the circular outline of the inner area to any desired non-circular outline. My method and machine is particularly suitable for producing a lens blank having a segment of the particular shape shown in Figure 19. This segment is slightly greater in area than a half circle and the upper edge thereof takes the form of a low flat arc. The lower edge is substantially semi-circular and is connected to the upper flat edge by two short arcs. However, my method and apparatus may also be used in producing lens blanks having segments of almost any non-circular outline.

Assuming that it is desired to produce a lens blank having a segment of the particular outline specified above, I will now describe the manner in which this is accomplished.

The lens blank B is first mounted on the lens blank carrier 96 (Figure 8) in the manner described. The cam 109, of an outline suitable for producing a segment of the desired outline, is mounted on the lens blank carrier. This cam, when producing a segment of the specific shape indicated, will be of substantially the shape illustrated in Figure 22.

The unit which carries the abrading tool, Figure 3, is then swung upwardly into an inoperative position and is held in such position by the latch member 129, as previously described. The lens blank carrier may then be mounted on the upper end of the spindle 91. The tapered upper end of this spindle will fit into the tapered socket formed in the chuck 105 of the lens blank carrier. The cam shown in the drawings is mainly of circular outline but has a flattened side 134. This cam will therefore cause the machine to produce a segment which is mainly of circular form but has one side flattened. The machine is adjusted so that the roller 116 will contact with the circular part of the cam 109. The rod 70 should then be in approximately vertical position. By means of the mechanism previously described, the rod 70 is adjusted about its own axis in such a manner that the center line of arm 76, the axes of pin 63, rod 70 and shaft 91 will all lie in the same plane. Furthermore, the rod 70 is so positioned that the lens blank carrier will swing about the axis of pin 63 in an arc of suitable radius to provide on the finished outer surface of the blank being ground, the desired radius of curvature. This positioning of the rod 70 is dependent upon the amount of stock it is desired to grind off of the outer surface of the lens blank B.

The next thing to be done is to adjust properly the abrading tool. The latch 129 is therefore released and the unit which carries the abrading tool is then swung downwardly into operative position. A shim is placed between the block 11 and the block 127. This shim should be of such a thickness as to bring the axis of pivot pin 21 into exact perpendicular relation with the axis of this spindle 91. This is done so that the abrading tool will accurately contact the surface to be abraded.

The screw mechanism 24 is loosened to permit turning of the pin 21 in the socket 20. The handwheel 14 may then be properly rotated to move the pin 10 and, consequently, block 11 transversely of the machine. The spindle 31 is tilted to such an extent that the axis thereof will be perpendicular at the center of the chord of the arc of curvature to be produced on the outer surface of the finished lens blank. When accurately adjusted in this tilted position, the screw mechanism 24 is operated to tightly hold the shaft 21 and, consequently, the tool-carrying spindle 31 in its accurately adjusted tilted position. The slide member 124 is now adjusted to position the roller 116 and the cam 109 so that the edge of the abrading tool will be disposed exactly at the edge of the circular inner area $B^2$ of the lens blank $B^1$. It should be remembered that during this adjustment the roller 116 is in contact with the circular part of the cam 109. The spindle 31 may be adjusted vertically in the housing or bearing 30 by means of the sleeve 32, in order to bring the abrading tool into proper contact with the surface of the lens blank. The machine is now ready for operation.

The shim member is left in position between the block 11 and the block 127. The rod 70 is then raised slightly by means of screw 72. Since the abrading tool will be in contact with the outer surface of lens blank B, there will be, consequently, a space between the lower surface of block 11 and the shim member. The weight of the unit which carries the spindle and abrading tool will be effective to keep the tool firmly in contact with the surface of the lens blank and will insure that the tool will work effectively on the surface of the blank. This contact may be aided by weights placed on pin 36. The motor 44 is operated to drive the tool-carrying spindle 31, which causes the abrading tool to rotate about its own axis. The motor 84 is also started in operation and this rotates the lens blank carrier about its own axis and also rotates the cam 109. The abrading operation will now progress until the under surface of block 11 contacts the shim member, when it practically ceases. This operation is repeated until the desired surface has been sufficiently ground or polished.

The cam is always held in contact with the roller 116 by means of spring 117. Therefore, when this cam rotates, it will cause movement of the unit, which carries the lens blank, transversely of the machine and relative to the abrading tool. This is due to the fact that the cam is provided with the flat portion 134. The cam causes the entire unit which carries the lens blank carrier to swing transversely of the machine and around the axis of pin 63.

The movement of the lens blank carrier and, consequently, the lens blank, relative to the abrading tool, while simultaneously rotating the lens blank, causes the abrading tool to traverse a closed non-circular path on the lens blank. Each time the roller 116 contacts with the flat portion of the cam 109, the tool will move in overlapping relation to the inner circular area $B^2$ of the lens blank B. However, while the roller is in contact with the circular portion of the cam, the tool will merely grind the outer surface $B^1$ outside of the area of the inner area $B^2$.

In Figures 14 to 18, inclusive, I illustrate more or less diagrammatically how this abrading operation progressively changes the shape of the area $B^2$ of the lens blank by grinding away a portion of this inner area. When the abrading operation is first started, it grinds away a small portion of the inner area $B^2$ adacent the center thereof and of approximately the shape shown at $B^3$ in Figure 16. The abrading operation will affect the inner area $B^2$ adjacent its center first, because the center will first contact the abrading tool due to the fact that the radius of curvature of $B^2$ is greater than the radius of curvature of $B^1$. As the abrading operation is carried on, a larger portion of the inner area will be ground away as indicated at $B^4$ in Figure 17. As the abrading operation progresses still further, the inner area is ground away still further as indicated at $B^5$ in Figure 18, where substantially the entire upper portion of the circular area $B^2$ is shown removed. The manner in which the abrading operation progressively removes portions of the inner area $B^2$ is illustrated diagrammatically in Figures 14 and 15.

This last abrading operation carried on by my machine not only changes the shape of the inner area $B^2$ to the shape shown in Figure 19, but also simultaneously grinds down the outer area $B^1$ of the lens blank B. The abrading operation is preferably carried on until the outer area $B^1$ is ground away to such an extent that it will merge with the inner area of the lens blank along the semi-circular portion thereof.

In Figure 19 I show a lens blank C which may be produced by the method just described. This lens blank will have an outer finished area $C^1$ of the desired curvature and this area usually serves as the distance field of the lens. This lens blank also has an inner segment C² which is surrounded by the outer area C¹. This segment will be greater in area than a semi-circle and will have a lower edge C³ of semi-circular outline which will merge with the outer area C¹. This is due to the fact that the cam is of such a shape that the abrading tool will grind away only a portion of the inner area B² of lens blank B. It will finish the outer area B¹ around the portion of the area B² not ground away. However, since the abrading tool cuts away a portion of the area B², a shoulder C⁴ is formed along a flat edge of the segment C². The cam is of such a shape that the upper flat edge of the segment will be connected to the lower semi-circular edge by short arcs C⁵ and the shoulder C⁴ continues along these short arcs. However, the shoulder C⁴ will not be of material height, because the upper flat edge will be located above the center of the semi-circular edge C³ of the segment. In this lens blank the optical center of the segment C² will be located adjacent the upper flat edge at the center of the semi-circular edge C³.

After the lens blank has been mounted on the machine and subjected to the abrading tool, it may be removed from time to time for inspection. To remove the lens blank for inspection, it is merely necessary to adjust the abrading tool-carrying unit into inoperative position and then to remove the lens blank carrier with the lens blank thereon. Since the cam is attached thereto, it will also be removed with the lens blank carrier. The cam will always occupy its original position relative to the lens blank and, therefore, when the carrier is replaced on the machine, there will be no chance of error due to a change in the relative positions of the cam and the blank.

After the lens blank has been completely finished, as shown in Figure 19, it may be removed, the opposite side finished and a lens of any desired shape cut therefrom.

Figure 9:
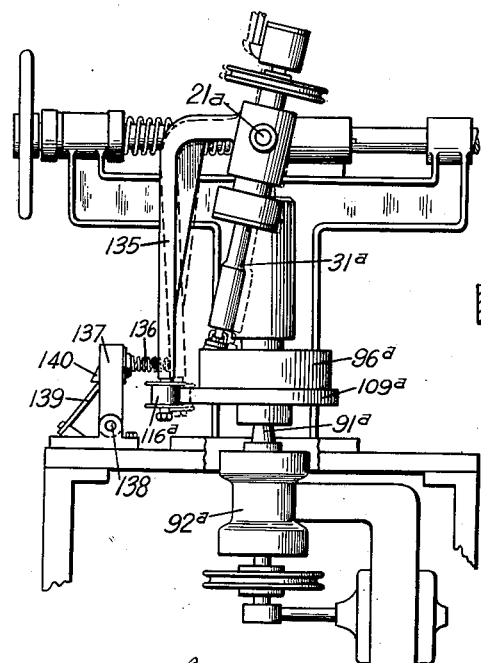
Figure 9 is an end elevation, similar to Figure 5, but showing a slightly modified form of machine, in this instance the tool-carrying spindle being moved by the cam relative to the lens blank carrier instead of the lens blank carrier being moved relative to the tool, as before.
Figure 8:
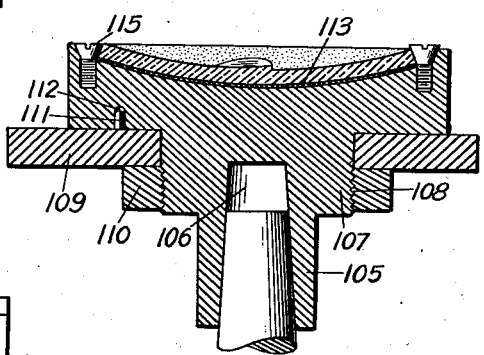
Figure 8 is a vertical section taken through the lens blank carrier and the cam and showing how the cam is attached to the lens blank carrier.

In Figure 9, I show a slightly modified form of apparatus which may be used in performing my method. In this instance, instead of having the lens blank carrier oscillate or move relative to the abrading tool, I have the abrading tool itself move relative to the lens blank carrier and the lens blank carrier held in immovable bearings.

Thus, in this figure, I show a housing 92a which is mounted so that it will not move laterally, as in the preferred form of my invention. This housing has the rotating spindle or shaft 91a mounted therein. This shaft carries a lens blank carrier 96a. A cam 109a is attached directly to the lens blank carrier as before. The tool-carrying spindle 31a is mounted to swing about a pivot 21a. The housing for the rotating tool-carrying spindle is provided with an arm 135 which extends outwardly and downwardly therefrom. The lower end of this arm has a flanged roller 116a rotatably mounted and vertically movable thereon. This roller will always contact with the edge of cam 109a. The roller is held in contact with the cam by means of a compression spring 136 which always presses against the arm 135 in a direction to maintain the roller in contact with the cam. This spring 136 is mounted on the upper end of a standard 137, which is pivoted at its lower end as at 138. Thus, the standard 137 may be swung down into horizontal position and this will permit movement of the roller 116a away from the cam to permit raising of the abrading tool into inoperative position. The standard 131 is normally held in vertical position by a latch member 139, which is pivoted at its lower end and which is swingable into and out of cooperative relation with a lug 140 disposed adjacent the upper end of the standard.

It will be apparent from this that when the cam 109a rotates it will contact with the roller 116a and will move the spindle 31a and, consequently, the abrading tool relative to the lens blank mounted on the rotating lens blank carrier. The spindle 31a is adjustable, as in my preferred apparatus, to insure the proper radius of swing between the face of the abrading tool and the pivot pin 21a. Thus, this machine will function in a manner very much like the preferred form of my machine.

Figure 20:
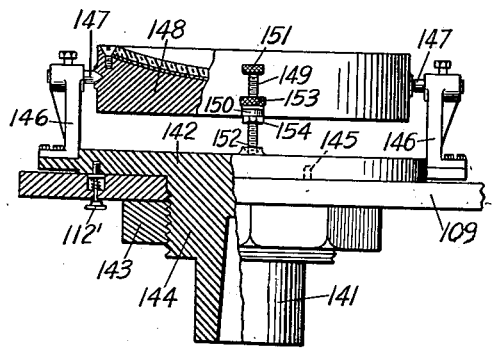
Figure 20 is a view, partly in section and partly in side elevation, showing a lens blank carrier mounted in such a manner that it may be tilted relative to the horizontal for the purpose of producing prism in the segment with the base thereof located as desired.
Figure 21:
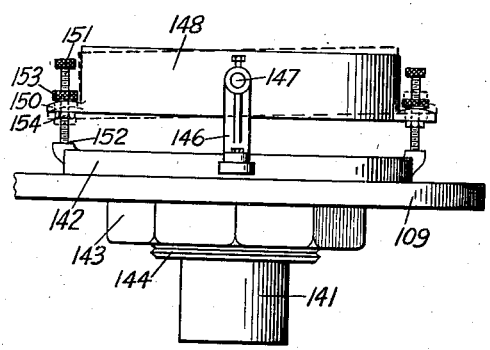
Figure 21 is a view similar to Figure 20, showing by dotted lines how the lens blank carrier may be tilted.

In some instances, it may be desirable to have a prism in the segment with the base thereof located at any desired place around the edge of the segment. For this purpose, I provide a lens blank carrier of the type illustrated in Figures 20 to 23, inclusive, which may be used on my machine. In these figures, the lens blank carrier is shown as comprising a chuck 141 which cooperates with the spindle which carries the lens blank. This chuck is formed on the body portion 142 of the lens blank carrier. The cam 109 may be mounted on the lens blank carrier as before through the medium of a nut 143 which is threaded on an enlarged threaded portion 144 of the chuck and below the cam to hold the cam in position. The upper surface of the cam 109 is provided with a spring-actuated locking pin 112′, (Figure 20). However, in this instance, the body portion 142 of the lens blank carrier, is provided with a plurality of sockets 145 with any one of which the pin 112′ may cooperate. Thus, the cam may be arranged in any of a number of positions relative to the body portion of the lens blank carrier and held firmly and accurately in any of such positions.

At diametrically opposite points on the body portion 142 of the lens blank carrier, I provide vertically disposed standards 146. These standards have adjustable pivot points 147 disposed on their upper ends. These pivot points extend into suitable sockets at correspondingly diametrically opposite points on the periphery of the cradle 148 in which the lens blank is mounted. It will be apparent that the cradle may be rocked around the pivot points 147. At diametrically opposite points, midway between the vertical standards 146, I provide set screw mechanism 149 for accurately controlling the rocking of the cradle on its supports. This set screw mechanism 149 comprises a lug 150 which is secured on the periphery of the cradle 148. This lug has a slot formed therein. A screw 151 passes through this slot and its lower end is threaded into the body portion 142 of the lens blank carrier, as indicated at 152. A nut 153 is disposed on the screw 151 above the lug 150 and a similar nut 154 is disposed on the screw below such lug. It will be apparent that by properly adjusting the nuts on each of the screws 151, which are disposed at opposite sides of the cradle 148, the cradle may be tilted to any desired extent, as indicated by the dotted lines in Figure 21. The cradle may be tilted in either direction and will be accurately held in any position to which it is tilted.

In using this structure, the lens blank is mounted on the cradle 148. If the cradle is disposed exactly in a horizontal position, and the cam mounted thereon is the same as cam 109, shown in Figure 22, a lens blank exactly like that illustrated in Figure 19 with the shoulder formed along the flat upper edge will be produced. In this instance, a line passing through axes of pivot pins 147 would also pass through the center of the lens blank carrier.

However, if it is desired to produce prism in the segment with the base thereof located adjacent one side of the segment, the cradle 148 is tilted in the proper direction. This will cause the abrading tool to grind away more of the outer surface of the lens blank at that side which is raised by tilting the cradle. Consequently, this will form a shoulder along the corresponding side of the segment.

Figure 22:
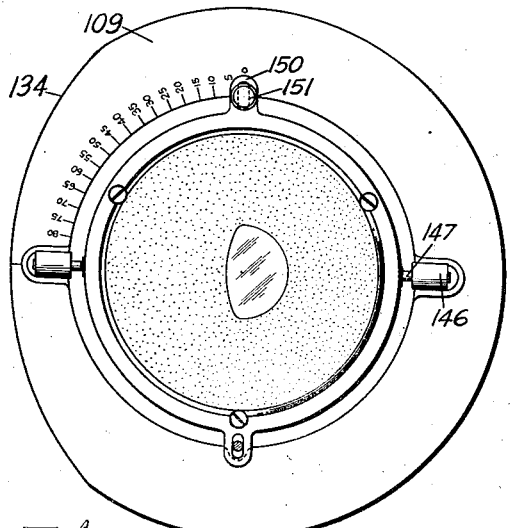
Figure 22 is a plan view of the lens blank carrier with a lens blank mounted thereon.
Figure 23:
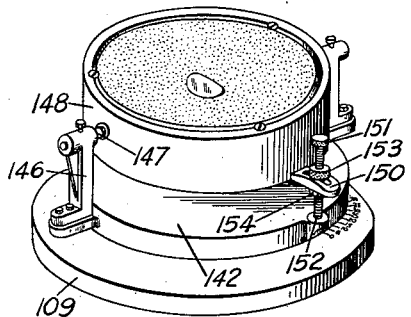
Figure 23 is a perspective view of the lens blank carrier with a lens blank mounted thereon.
Figures 24, 25:
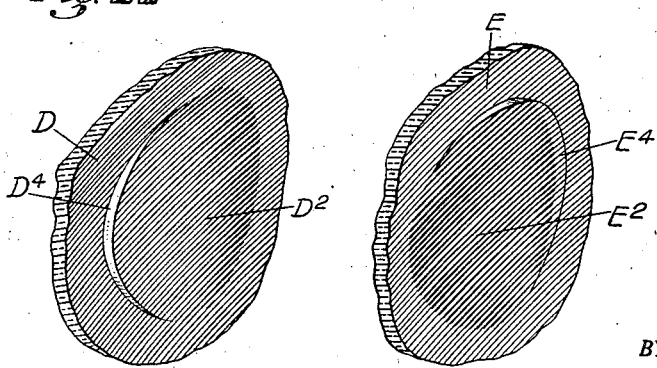
Figure 24 is an enlarged perspective view of a portion of a finished blank, made according to my invention, having prism formed in the segment with the base of the prism disposed at one of the side edges of the segment.
Figure 25 is a view similar to Figure 24, showing a segment with the base of the prism formed therein located at the opposite side edge thereof.

If the cam 109 is disposed as indicated in Figure 22, with the flat side thereof substantially perpendicular to a line passing through the pivot points 147, the base of the prism may be formed adjacent either of the sides of the segment by tilting the cradle in the proper direction. Lens blanks produced in this manner are indicated in Figures 24 and 25. In Figure 24, I show a lens blank D having a segment D² of the shape shown in the plan view in Figure 22. This segment D² has the base of the prism formed therein located along the shouldered edge D⁴ which is at the left-hand side of the segment. The shoulder is formed in this location by tilting the cradle 148 in the proper direction, with the cam disposed relative thereto, as indicated in Figure 22. In Figure 25 I show a lens blank E practically identical with the lens blank D, with the exception that the shoulder E⁴ of the segment E² is disposed at the opposite side edge. This blank is formed in this manner by tilting the cradle in the opposite direction.

However, if it is desired to form the shoulder at any other position along the edge of the minor segment, the cam 109 must be rotated relative to the cradle 148 and then held in any of its position to which it is adjusted. Because of the pin 112', and the various sockets 145, the cam may be rotated relative to the cradle 148 to various positions and held in any of such various positions. In this manner, the shoulder may be formed any place along the edge of the minor segment.

It will be apparent that with this structure it is possible to tilt the lens blank relative to the abrading tool and to arrange the cam relative to the cradle 148, in such a manner that prism may be produced in the segment with the base of the prism located along the edge of the segment at any desired position therealong. Thus, the optical center of the segment may be located as desired. While I have shown a means for tilting the blank after the depressed central area has been formed in order that a prism element may be incorporated in the blank, it is equally possible to form the prism element by tilting the blank at the proper angle and then forming the depressed area in tilted relationship with the outer area. The finishing of the outer surface then proceeds in the manner first described, without further tilting of the blank.

The means for tilting the lens is not limited to the means shown but may be accomplished by any other suitable means.

While I have shown a cam as a means for producing and controlling relative movement between the lens blank carrier and the abrading tool, it will be apparent that other means might be used for this purpose.

It will be apparent from the preceding description that I have provided novel apparatus which is particularly adaptable to the production of a lens blank with a segment of any desired size and outline. Furthermore, the shape of the segment produced will be very accurate and it is possible to produce segments of identical shape in a plurality of lens blanks. The apparatus which I have provided is of such a nature that the lens blanks produced thereby will be of superior quality. Further, the apparatus which I have provided for carrying out my method is also simple, positive and efficient in operation.

With my apparatus it is possible to produce segments with prism therein and with the base of the prism located as desired. Consequently, it is possible to locate the optical center of the segment as desired.

Although in describing the method, I state that the annular outer area and the smaller inner area of circular outline on the lens blank B may be produced on any of the machines commonly used for this purpose in the art, it is also possible to use my machine for producing these surfaces. In using my machine for this purpose, it will be necessary to either use a circular cam or to prevent the lens blank carrier from oscillating or moving relative to the abrading tool. One of the areas will first be ground by my apparatus and then the other area will be ground.

Many other advantages of my apparatus have been previously pointed out in this specification. Many more will be readily apparent from this application, the drawings and the following claims.

Having thus described my invention, what I claim is:

1. Apparatus for producing one-piece multifocal ophthalmic lens blanks, comprising a lens blank carrier mounted for swinging movement, means for rotating said lens blank carrier, an abrading tool mounted on a tool-carrying spindle and disposed in position to work upon a lens blank mounted on said carrier, said tool-carrying spindle being so mounted that its axis swings in a vertical plane, means for holding said spindle in any desired position, means for causing said lens blank carrier to swing in a vertical plane through such an arc as will produce on the surface of the lens blank a surface of desired radius, and so that the axis thereof will move in the same vertical plane through which the axis of said tool-carrying spindle swings, said means comprising a cam which is mounted on said lens blank carrier and a member with which said cam is always in contact, said member being automatically vertically adjustable to compensate for movement of the cam in an arc caused by the swinging movement of said lens blank carrier.

2. Apparatus for producing one-piece multifocal ophthalmic lens blanks, comprising a lens blank carrier mounted for swinging movement, means for rotating said lens blank carrier, an abrading tool mounted on a tool-carrying spindle and disposed in position to work upon a lens blank mounted on said carrier, said tool-carrying spindle being so mounted that its axis swings in a vertical plane, means for holding said spindle in any desired position, means for swinging the said lens blank carrier so that its axis swings in the same vertical plane, said means comprising a cam which is mounted on said lens blank carrier and a roller with which said cam is always in contact, said roller being automatically vertically adjustable to compensate for movement of the cam in an arc caused by the swinging movement of said lens blank carrier, other means for vertically adjusting said roller and holding it in adjusted position, and means for adjusting said roller laterally of the cam.

3. Apparatus for producing one-piece multifocal ophthalmic lens blanks, comprising a lens blank carrier mounted on a rotatable spindle, means for rotating said spindle, an abrading tool disposed in position to form a surface on a lens blank mounted on said carrier, said lens blank carrier including a cradle which is so mounted that it may be tilted relative to the horizontal, means for holding the cradle in any tilted position, a cam carried by said lens blank carrier for causing periodic movements between said lens blank carrier and said abrading tool, and means for adjusting said cam to various positions relative to said cradle and for holding said cam in any adjusted position.

4. Apparatus for producing ophthalmic lens blanks comprising a member for carrying a lens blank, an abrading tool member normally disposed in position to work upon a lens blank mounted upon said member, one of said members being pivoted for swinging movement about a horizontal axis relative to the other in a vertical plane, means for causing said member to swing relative to the other member in an arc such that the proper arc of curvature will be produced on the lens blank, said means comprising a cam carried by said member and a follower with which the cam always contacts, said follower being so mounted that it is adjustable automatically in a vertical direction to compensate for swinging of said cam caused by swinging of said member.

5. Apparatus for producing ophthalmic lens blanks, comprising a member for carrying a lens blank, an abrading tool member normally disposed in position to work upon a lens blank mounted upon said member, one of said members being pivoted for swinging movement about a horizontal axis relative to the other in a vertical plane, means for causing said member to swing relative to the other member in an arc such that the proper arc of curvature will be produced on the lens blank, said means comprising a cam and a follower with which the cam always contacts, said follower comprising a flanged roller which is adjustable automatically in a vertical direction to compensate for swinging of said member.

6. Apparatus for producing one-piece multifocal ophthalmic lens blanks, comprising a rotatable lens blank carrier, a rotatable abrading tool mounted on a tool-carrying spindle and normally disposed in position to work upon a lens blank mounted on said carrier, means for driving said carrier and tool, means for adjusting said spindle longitudinally of itself, means for moving said carrier and tool periodically relative to each other, said tool-carrying spindle being pivotally connected to a supporting structure for swinging movement, means for maintaining said spindle in any desired position, said supporting structure being pivotally mounted on the machine so that the abrading tool may be swung into or out of operative position relative to said lens blank carrier.

LOWELL L. HOUCHIN.